United Stat

Kusenberg et al.

Re. 28,498 ssued July 29, 1975

[54] METHOD OF PRODUCING A THICK-WALLED CURED PLASTICS MOULDING

[75] Inventors: Eugen Kusenberg, Basel; Ernst Hubler, Fullinsdorf; Hans-Rudolf Aus der Au, Reinach, Basel-Land; Otto Ernst, Pfeffingen, all of Switzerland

[73] Assignee: Ciba-Geigy AG, Basel, Switzerland

[22] Filed: Feb. 26, 1974

[21] Appl. No.: 446,104

Related U.S. Patent Documents

Reissue of:

[64] Patent No.: 3,777,000
Issued: Dec. 4, 1973
Appl. No.: 273,171
Filed: July 19, 1972

U.S. Applications:

[63] Continuation of Ser. No. 45,123, June 10, 1970, abandoned.

[30] Foreign Application Priority Data

June 19, 1969 Switzerland ..... 9385/69

[52] U.S. Cl. ..... 264/327; 264/328
[51] Int. Cl. ..... B29g 7/00
[58] Field of Search ..... 264/327, 328

[56] References Cited

UNITED STATES PATENTS

| | | | |
|---|---|---|---|
| 2,738,551 | 3/1956 | Howald | 264/328 |
| 3,208,750 | 9/1965 | Firth | 264/328 X |
| 3,372,214 | 3/1968 | Marcey | 264/25 |
| 3,505,448 | 4/1970 | Zijp | 264/328 |

OTHER PUBLICATIONS

Lekutherm X20, Publication of Farbenfabriken Bayer AG Leverkusen June 1960, p. 11 & 12 relied on.

*Primary Examiner*—Richard R. Kucia
*Attorney, Agent, or Firm*—Wenderoth, Lind & Ponack

[57] ABSTRACT

Thick-walled, cured plastics mouldings are produced by pouring a preheated, highly reactive liquid casting resin composition, which is capable of setting within a period of three to sixty minutes, such as an epoxide resin composition, into a preheated mould substantially without the application of pressure so as substantially to fill the mould, the temperature of the mould being sufficient to initiate curing of the resin composition and the temperature of the composition being at least 10% below the temperature of the mould, said temperatures being measured in degrees centigrade; further composition is supplied to the mould with the application of gentle pressure to compensate for shrinkage until the composition has set, whereafter the set moulding can be removed from the mould. The specified temperature difference between the mould and the composition ensure that relatively minor temperature gradients arise and enables good quality mouldings of any desired size to be made.

3 Claims, 1 Drawing Figure

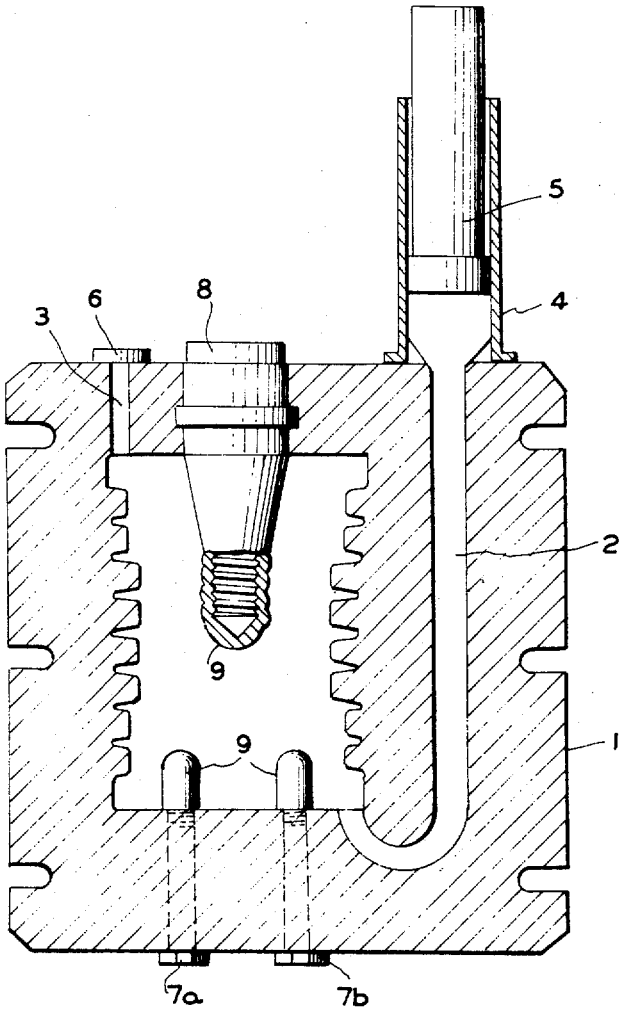
INVENTORS
EUGEN KUSENBERG
ERNST HUBLER
HANS-RUDOLF AUS DER AU
OTTO ERNST
BY Wendroth, Lind & Ponack
ATTORNEYS

METHOD OF PRODUCING A THICK-WALLED CURED PLASTICS MOULDING

Matter enclosed in heavy brackets [ ] appears in the original patent but forms no part of this reissue specification; matter printed in italics indicates the additions made by reissue.

---

This is a continuation of application Ser. No. 45,123, filed June 10, 1970 and now abandoned.

This invention relates to a method of producing a thick-walled cured plastics moulding, particularly electrical insulators, by casting.

Contrary to the processes of die pressing, extruding and injection moulding the casting resin composition used in a casting process is poured into a mould substantially without the application of pressure and allowed to set in the mould. Since gravity is usually sufficient for filling the mould and the casting resin composition is not exposed to elevated pressure while it sets, as is the case in all pressing processes, casting can be performed with the aid of very simple and cheap equipment. The more expensive machines (usually hydraulic presses or injection moulding machines) required for pressing processes are unnecessary for casting, and tooling up is therefore also correspondingly cheaper and simpler.

These advantages of casting over pressing are particularly pronounced when heavy mouldings are required or when a relatively small number of similar mouldings are to be produced and the cast of the moulds and machines would constitute a particularly high proportion of the production cost.

On the other hand, casting processes hitherto proposed when compared with pressing processes have the drawback that the duration of the working cycle is very much longer. In casting processes, the fact must be accepted that the moulds remain filled for many hours.

According to the present invention there is provided a method of producing a thick-walled cured plastics moulding, wherein a preheated, highly reactive liquid casting resin composition which is capable of setting with a period of three to sixty minutes is poured into a preheated mould substantially without the application of pressure so as substantially to fill the mould, the temperature of the mould being sufficient to initiate curing of the resin composition and the temperature of the composition being at least 10% below the temperature of the mould, said temperatures being measured in degrees centigrade, and wherein further composition is supplied to the mould with the application of gentle pressure for compensating for shrinkage of the composition until the composition has set, whereafter the set moulding is removed from the mould.

The thick-walled mouldings which are produced by the present method are understood to be mouldings which comprise at least one compact zone having a volume sufficiently large to contain an inscribed sphere of 4 cm. diameter.

Surprisingly it has been found that in practice the present method permits compact bodies of any size and of unexceptionable quality to be produced in times averaging from five to fifteen minutes.

The highly reactive casting resin composition preferably comprises an epoxide resin which may include a mineral filler, such as silica or alumina.

There has been a prejudice among persons skilled in the art against the use of particularly highly reactive casting resin compositions because such compositions—particularly in large compact masses—are known to become very hot because of their exothermic curing reaction, and in certain circumstances this is liable not only to result in poor quality castings but also to cause carbonization of the casting resin composition itself.

In the present method, the specified difference between the temperature of the mould and the pouring temperature of the casting resin composition is capable of ensuring that relatively only minor temperature gradients will arise in different parts of the casting during the process of gelling and setting. The two temperatures may be so chosen that the temperature in the center of the casting or of the casting composition will not reach the temperature level of the casting composition at the mould wall until the casting has sufficiently set to enable it to be removed from the mould. If at the same time care is taken to see that during the gelling phase more resin material can continue to flow into the mould to compensate shrinkage, castings having low internal stresses will be obtained. Mouldings that are free from cracks and internal cavities and that are of excellent quality can be produced. The continued replenishing of casting resin composition during the gelling phase can be ensured for instance by keeping the temperature of the casting composition in the sprue as nearly as possible at the original temperature of the casting resin composition. At the same time, a plunger or a connection to a gas pipe may be provided to apply gentle pressure on the mass in the sprue.

With the present method of casting, the times the castings remain in the moulds are substantially shorter, and the risk of cavity formation inside the casting is eliminated. Furthermore, internal stresses are reduced and the shaped bodies produced have good mechanical strengths, there being no risk of crack formation and the mechanical properties of castings produced in the same way being less liable to fluctuate, due to the lower temperature gradients in the casting composition at different points inside the mould during curing.

The present method is suitable for the production of large mouldings, particularly of mouldings which comprise parts that vary considerably in cross-section or shape, such as insulators, in the form of solid bodies with thin fins or sheds.

In order to enable the invention to be more readily understood, reference will now be made to the accompanying drawing, which illustrates diagrammatically and by way of example a cross-section through a casting mould for use in the method of the present invention.

Referring now to the drawing, there is shown a casting mould 1 for casting a finned solid electrical insulator, the mould having a sprue 2 and a venting riser 3. The sprue 2 is connected to a cylinder 4 into which a plunger 5 for the generation of after-pressure is insertable after the mould has been filled with a casting resin composition. The riser 3 is provided with a closure 6, preferably constructed in the manner of a pressure valve. The casting mould is provided with locating means 7a, 7b and 8 for fittings 9 that are to be embedded in the casting.

The invention will now be further illustrated by the following examples of casting operations using the casting mould just described.

EXAMPLE 1

1,500 parts by weight of a mineral filler obtainable in the trade under the name "quartz meal K8" were mixed at a temperature of 120 to 130° C. with 750 parts by weight of a polyglycidyl ether resin which was solid at room temperature and had an epoxide content of 2.6 epoxide equivalents per kg., the resin having been produced by reacting epichlorohydrin with bis-(4-hydroxyphenol)-dimethylmethane in the presence of alkali. The mixture was deaerated in the vacuum generated by a water jet pump. After the addition of 225 parts by weight of phthalic anhydride, 10 parts by weight of isomerised methyl tetrahydrophthalic anhydride, 0.33 to 0.66 part by weight of benzyl dimethylamine and up to 0.39 part by weight of tetrabutyltitanate the mixture was again briefly vacuum treated. The resultant casting composition was poured at a temperature of 120 to 130° C. into a 10 kv. insulator mould as shown in the drawing, the mould having been preheated to 160° C. The casting was allowed to gel and set with the application of gentle after-pressure (3 kg./sq. cm.). The casting could be removed from the mould at the end of 10 minutes.

The insulator thus produced was bubble-free and had a flawless surface. The breaking strength measured according to DIN 48, 136 (Deutsche Industrie Normen) proved to have the high value of 1700 kg.

EXAMPLE 2

160 parts by weight of dibutyl phthalate and 1,200 parts by weight of the aluminum oxide trihydrate that is available in the trade under the name DT 080 and produced by Ciba A.G. of Basel, Switzerland, were mixed at a temperature of 40 to 50° C. with 640 parts by weight of a polyglycidyl ether resin which was liquid at room temperature, had an epoxide content of 5.4 epoxide equivalents per kg. and had a viscosity of about 10,000 cp., measured at 25° C. (the resin having been produced by reacting epichlorohydrin with bis-(4-hydroxyphenyl)-dimethylmethane). The mixture was deaerated in the vacuum generated by a water jet pump and then mixed with 60 parts by weight of triethylene tetramine as a hardener and again briefly evacuated. The resultant casting resin composition was poured at a temperature of 40 to 50° C. into the mould which is shown in the drawing, and which had been preheated to 90° C. It was allowed to set with the application of after-pressure. After 10 minutes, the casting could be removed from the mould.

The insulator thus produced, notwithstanding the highly exothermic curing reaction, was surprisingly free from bubbles and had a flawless surface. After having cooled to room temperature, the insulator had a breaking strength according to DIN 48,136 of about 1,000 kg.

EXAMPLE 3

At a temperature 80 to 90° C., 375 parts by weight of hexahydrophthalic anhydride as a hardener and 1,650 parts by weight of the aluminium oxide trihydrate described in Example 2 as a filler was added to 375 parts of a diglycidyl-3,4-tetrahydrophthalate which was liquid at room temperature and had an epoxide content of 6.3 ±0.3 epoxide equivalents per kg. and a viscosity at 25° C. of 450 to 550 cp. As an accelerator, 23 parts by weight of a mixture consisting of 21 parts by weight of a sodium alcoholate obtained by dissolving 0.82 part of sodium metal at 120° C. in 100 parts of 2,4-dihydroxy-3-hydroxymethylpentane, and 2 parts by weight of benzyldimethylamine, were added, the mixture being briefly deaerated in the vacuum of a water jet pump and at a temperature of 80 to 90° C., poured into the mould shown in the drawing, which had been preheated to a temperature of 137° C., and in which the composition was allowed to set under gentle after-pressure (3 kg./sq. cm.). The resulting insulator could be taken out of the mould at the end of 5 minutes.

No casting flows were detectable on the insulator thus produced. The breaking strength according to DIN 48, 136 was measured and found to be 1,400 kg., whereas the resistance to an electric arc according to DIN 53,484 attained the highest grade L4. Moreover, the material of this insulator is not easily flammable and can be installed indoors as well as in the open.

We claim:

1. In a method of producing a cured plastic molding which is comprised of the steps of providing a mold having an inlet gate and having a volume of at least several hundred cubic centimeters and at least one compact zone with a volume sufficiently large to contain an inscribed sphere of at least four centimeters and which will produce a thick walled molding, providing a highly reactive crosslinkable resin composition which is capable of setting within a period of from three to sixty minutes and has a setting temperature at which said setting takes place and which has an exothermic curing reaction, preheating the mold to a temperature sufficient to initiate curing of said resin composition, and pouring the resin composition into the mold to form a casting, the improvements comprising:

a. prior to the step of pouring, preheating the resin composition to a pouring temperature at which the resin composition is liquid and which is [ at least 10% ] *from 10–56%* below the temperature to which the mold has been preheated, the temperature to which the mold has been preheated and the pouring temperature being so chosen that, at the rate of pouring, the temperature in the center of the resin composition in the mold will not reach the temperature of the resin composition at the mold wall until the casting has sufficiently set to enable it to be removed from the mold, b. during the pouring step, maintaining the supply of liquid resin composition into the mold during the gelling phase of the resin composition in the mold and maintaining the temperature of the liquid resin composition flowing through the inlet gate of the mold at least approximately at the pouring temperature, and c. at least from the point of time at which the mold is substantially filled, exerting pressure on the supply of liquid resin composition for supplying the composition with the mold at a pressure sufficient to compensate for shrinkage, whereby only minor temperature gradients arise in different parts of the casting during the gelling and setting of the resin composition, and the casting can be removed from the mold after short periods of time.

2. A method as claimed in claim 1, wherein at the commencement of the pouring operation the temperature of the resin composition is between 18 to 56% below the temperature to which the mould has been preheated.

3. A method as claimed in claim 1, wherein the supply of further liquid resin composition is effected with a pressure of about 3 kg./sq.cm.

[ 4. A method as claimed in claim 1, wherein the casting resin composition is capable of setting in at least ten minutes.]

[ 5. A method as claimed in claim 1, wherein the casting resin composition is capable of setting in at least five minutes.]

* * * * *